(12) United States Patent
Gocha et al.

(10) Patent No.: US 11,796,100 B2
(45) Date of Patent: Oct. 24, 2023

(54) CONNECTOR HAVING A MATING HEAD

(71) Applicant: Cooper-Standard Automotive Inc., Northville, MI (US)

(72) Inventors: Kenneth J. Gocha, Flint, MI (US); Stephen S. Frederiksen, Clarkston, MI (US); Christian A. Veraza, Auburn Hills, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 0 days.

(21) Appl. No.: 17/526,856

(22) Filed: Nov. 15, 2021

(65) Prior Publication Data

US 2022/0074528 A1 Mar. 10, 2022

Related U.S. Application Data

(63) Continuation of application No. 16/998,869, filed on Aug. 20, 2020.

(60) Provisional application No. 62/890,445, filed on Aug. 22, 2019.

(51) Int. Cl.
*F16L 37/088* (2006.01)
*F16L 33/03* (2006.01)

(52) U.S. Cl.
CPC ........... *F16L 37/0885* (2019.08); *F16L 33/03* (2013.01); *F16L 2201/10* (2013.01)

(58) Field of Classification Search
CPC ... F16L 37/0885; F16L 37/088; F16L 37/144; F16L 2201/10; F16L 33/03; F16L 33/227
See application file for complete search history.

(56) References Cited

U.S. PATENT DOCUMENTS

| | | | | | |
|---|---|---|---|---|---|
| 5,568,946 A | * | 10/1996 | Jackowski | .......... | F16L 37/0987 285/308 |
| 5,873,610 A | * | 2/1999 | Szabo | ................ | F16L 37/0987 285/308 |
| 6,318,764 B1 | * | 11/2001 | Trede | .................... | F16L 37/144 285/308 |
| 6,428,055 B1 | * | 8/2002 | Moretti | ................. | F16L 37/084 285/308 |
| 6,837,525 B2 | * | 1/2005 | Miyajima | ............. | F16L 37/098 285/903 |
| 7,014,221 B2 | * | 3/2006 | Iwasaki | ............... | F16L 37/0987 285/282 |
| 7,328,922 B2 | * | 2/2008 | Takayanagi | ........... | F16L 37/098 285/308 |
| 7,494,156 B2 | * | 2/2009 | Okada | ................. | F16L 37/0987 285/319 |

(Continued)

FOREIGN PATENT DOCUMENTS

| | | | | |
|---|---|---|---|---|
| DE | 10017679 C1 * | 9/2001 | ....... | F02M 35/10144 |
| WO | WO-2018104616 A1 * | 6/2018 | .......... | F16L 37/0885 |

*Primary Examiner* — Zachary T Dragicevich
*Assistant Examiner* — Alexander T Rufrano
(74) *Attorney, Agent, or Firm* — Paschall & Associates, LLC; James C. Paschall

(57) ABSTRACT

A connector and a process for coupling a tube to another device is disclosed. The connector comprises a receptacle for receiving a first tube. The receptacle includes a socket and a modular head mated to said socket in one of a plurality of relative orientations. The modular head comprises an indexing member. A retention clip embraces the receptacle and has a leg positioned in a slot in the receptacle.

17 Claims, 4 Drawing Sheets

(56) References Cited

U.S. PATENT DOCUMENTS

| | | | |
|---|---|---|---|
| 7,552,948 B2 * | 6/2009 | Matsuno | F16L 37/0985 |
| | | | 285/308 |
| 7,571,939 B2 * | 8/2009 | Yoshida | F16L 37/0885 |
| | | | 285/308 |
| 7,618,070 B2 * | 11/2009 | Stoll | B29C 66/5344 |
| | | | 285/379 |
| 8,979,134 B2 | 3/2015 | Schroter et al. | |
| 9,777,876 B2 * | 10/2017 | Kaneko | F16L 37/0885 |
| 9,890,887 B2 * | 2/2018 | Barthel | F16L 37/0841 |
| 9,915,388 B2 * | 3/2018 | Hatanaka | F16L 37/144 |
| 10,047,888 B2 * | 8/2018 | Nishiyama | F16L 21/08 |
| 10,066,773 B2 * | 9/2018 | Takimoto | F16L 37/0885 |
| 10,975,995 B2 * | 4/2021 | Blivet | F16L 37/248 |
| 11,149,888 B2 * | 10/2021 | Delorme | F16L 37/0885 |
| 2004/0178629 A1 * | 9/2004 | Yoshida | F16L 37/0885 |
| | | | 285/305 |
| 2009/0035055 A1 * | 2/2009 | Rosch | F16L 37/0982 |
| | | | 403/314 |
| 2021/0239248 A1 * | 8/2021 | Watson | F16L 37/0925 |

* cited by examiner

CONNECTOR HAVING A MATING HEAD

CROSS-REFERENCE TO RELATED APPLICATIONS

This application is continuation application of U.S. patent application Ser. No. 16/998,869, filed Aug. 20, 2020 that claims priority from provisional application 62/890,445, filed Aug. 22, 2019, both incorporated herein in their entirety.

FIELD

The field relates to a connector for connecting a tube to a device and that enables connection with tubes of several orientations.

BACKGROUND

In fluid piping in which a tube, such as a pipe or a hose, is joined to another device such as a pump, tank or another tube, a connector may be used for joining the tube to the other device. The connector may have a tubular receptacle for receiving a tube. The tube may include an endform for snap engagement to enable quick connection with a retainer to provide locking relation between the tube and the connector. A wire retainer is often used that has a pair of engagement arms that extend through slots in the receptacle to clip endform in the connector.

The connector may include a seal ring between an inner periphery of a socket in the connector and an outer periphery of the endform to provide a fluid-tight seal that prevents leaking. Insufficient insertion of endform into the connector can permit the seal to lack engagement endform and the connector to leak.

Fluid piping connectors may find use in the auto industry. The connector is often equipped with an indexing member to align with an indexing member on the endform to ensure that endform is inserted with the proper orientation. Several orientations between the endform and the connector are often applicable, multiplying the number of connectors that must be made available to serve all orientations.

A wire retainer can be made of a material that is harder than the tube or an endform on the tube. As the endform of the tube is inserted into the connector, the inwardly biased retainer can scrape the endform of the tube to an extent that it prevents or inhibits a fluid tight seal facilitated by the seal ring It would be desirable to provide a connector that enables connection with tubes of several orientations.

It would also be desirable to provide a connector that indicates that connection with the endform is sufficient.

It would be desirable to provide a connector that prevents contact between the tube or its endform with the wire retainer during insertion.

SUMMARY

A connector and a process for coupling a tube to another device comprises a receptacle for receiving a first tube. The receptacle includes a socket and a modular head mated to said socket in one of a plurality of relative orientations. A retention clip embraces the receptacle and has a leg positioned in a slot in the receptacle. The modular head may comprise an indexing member.

DETAILED DESCRIPTION

Figure 1:
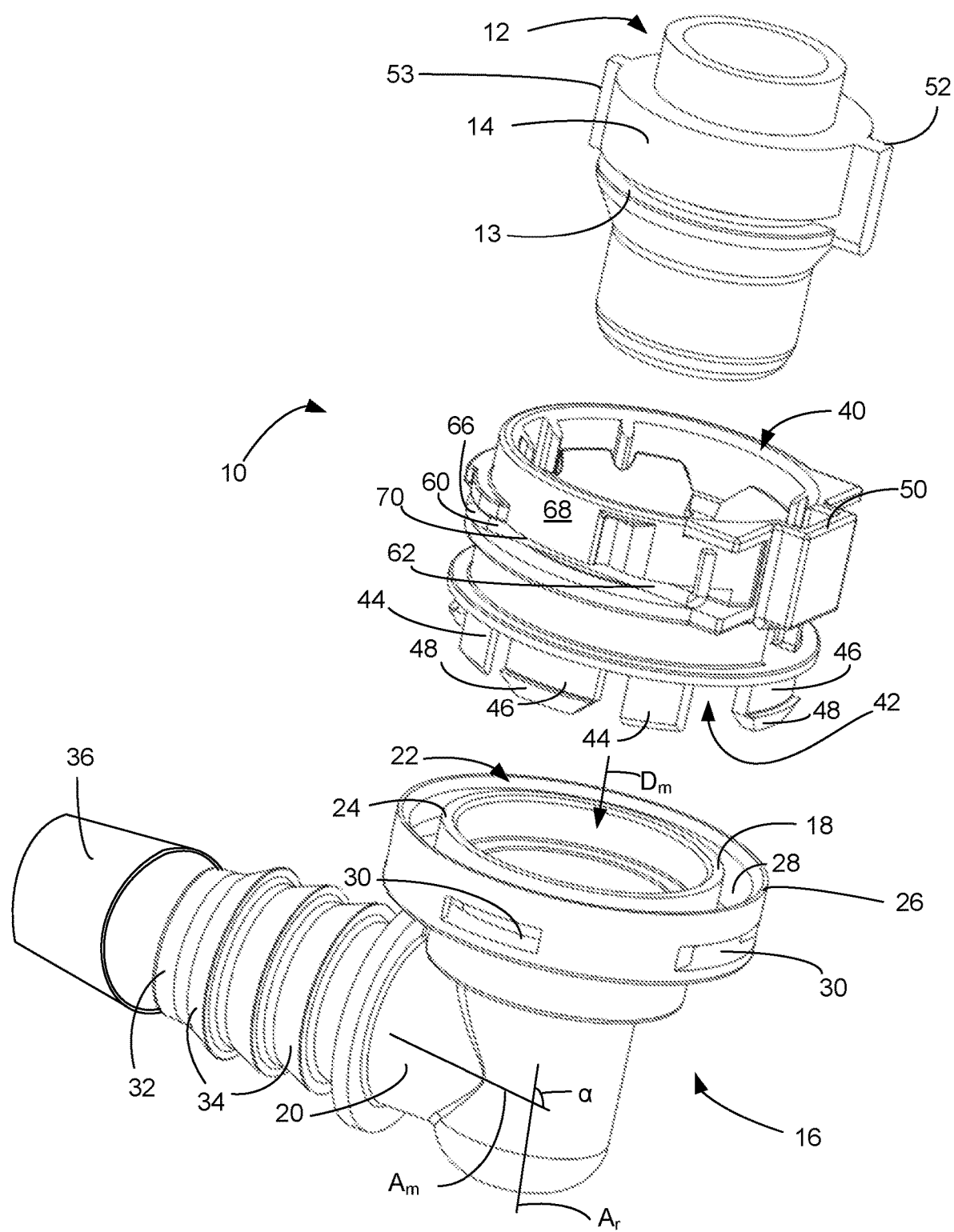
FIG. 1 is an exploded isometric view of a disassembled connector and tube.

A connector 10 is illustrated in FIG. 1 in an exploded view for coupling a tube 12 to another device. The other device may be another tube, or it could be a tank or a pump, for example. The tube 12 is partially shown in FIG. 1 and includes an endform 14 secured on an end of the tube 12. The tube 12 may be a hose, a pipe, or fluidly communicate with another device. The endform 14 may include a groove 13. The connector 10 may be tubular defining a hollow passage through which a fluid may pass to or from the tube 12. In an aspect, the connector 10 may have an annular configuration made up of generally hollow cylindrical segments.

The connector 10 comprises a receptacle 16 for receiving the endform 14 of the tube 12. The receptacle 16 may comprise two separate pieces. The first piece of the receptacle 16 is a socket 22. The socket 22 has a female end 18 and a coupling end 20. The female end 18 of the socket 22 receives the end of the tube 12. Specifically, the socket 22 may receive the endform 14 of the tube 12 therein. The socket 22 may comprise an annular inner wall 24. The receptacle may also include an annular outer wall 26 which may be concentric with the inner wall 24. The outer wall 26 and the inner wall 24 may define an annulus 28 therebetween.

An opening 30 may be fashioned in the outer wall 26. In an aspect, a plurality of openings 30 may be fashioned in the outer wall 26. The opening 30 may be rectangular and extend completely through the outer wall 26. One or both of the inner wall 24 and the outer wall 26 may have a bevel at the female end 18 tapering inwardly away from the female end.

The coupling end 20 may be for coupling the connector 10 to another device. The coupling end 20 may include a male stem 32 for mating with a receptacle of another device. The male stem 32 may include one or more barbed flanges 34 that can be friction fitted into another tube 36, for example, to couple the connector 10 to the other tube. In this embodiment, fluid from the tube 12 can pass from the tube through the female end 18 of the socket 22 and through the male stem 32 of the coupling end 20 of the connector 10 and into the other tube 36 or vice-versa. The coupling end 20 may extend at an angle from the receptacle 16, which means that the coupling end 20 has a feature, such as the male stem 32, having a longitudinal axis, $A_m$, that is not linear with a longitudinal axis, $A_r$, of the receptacle 16. The longitudinal axes $A_m$ and $A_r$ may define an angle α between them that is not equal to 180 degrees.

The second piece of the receptacle 16 is a modular head 40. The modular head 40 has a mating end 42 with a projection 44 extending from the mating end and a latch 46 extending from the mating end. In an aspect, a plurality of latches 46 and/or a plurality of projections may extend from the mating end 42. The modular head 40 mates with the socket 22 to provide the receptacle 16. The mating end 42 of the modular head 40 is inserted into the female end 18 of the socket 22 such that the projection 44 and the latch 46 are inserted into the annulus 28 between the annular inner wall 24 and the annular outer wall 26. The latch 46 may include a detent 48. The projection 44 and the latch 46 are received in the annulus 28 during mating. The detent 48 is chamfered at the mating end 42 and positioned to ride against the inside of the outer annular wall 26 in the female end 18 of the socket 22 and flex inwardly while the modular head 40 is mated with the socket 22. The detent 48 has a flat facing away from mating end 42 in a direction $D_m$ of mating. The detent 48 is configured to fit in the opening 30. When fully mated, the flat moves past a near edge of the opening 30 in the socket 22 allowing the detent 48 to snap into the opening and the flat to latch the modular head 40 into the socket 22. In an aspect, the socket 22 may include the detent 48 and the modular head 40 may include the opening 30. In a further aspect, the socket 22 may include a plurality of openings 30 and the modular head 40 may include a matching plurality of detents 48. In an even further aspect, the socket 22 may include a plurality of detents 48 and the modular head 40 may include a plurality of openings 30. The detents 48 are configured and dimensioned to fit in respective ones of the openings 30.

The socket 22 and the modular head 40 may be separate pieces before they are mated together to provide the receptacle 16. The socket 22 and the modular head 40 may be separately molded of a thermoplastic material such as polyamide or polyphthalamide.

The modular head 40 may comprise an indexing member 50 thereon for alignment with an indexing member 52 on the endform 14 of the tube 12 to ensure proper orientation therebetween. The indexing member 50 on the modular head may be a groove and the indexing member 52 on the endform 14 of the tube 12 may be a tab which is received in the groove to ensure proper alignment while inserting the endform 14 of the tube 12 into the receptacle 16 after the socket 22 is mated with the modular head 40. In an aspect, the tab could be the indexing member 50 on the modular head 40 and the groove could be the indexing member 52 on the endform 14 of the tube 12. The endform may omit an indexing member 52, and it may include an additional indexing member 53.

The modular head can be mated to the receptacle in a plurality of relative orientations. The latches 46 with the plurality of respective detents 48 are equidistant from each other around the modular head 40. In other words, the detents 48 are at equivalent radial positions. Accordingly, the modular head 40 is adaptable to be mated to the receptacle 16 in a plurality of orientations.

In the embodiment of FIG. 1, the openings 30 in the female end 18 of the socket 22 are at four equidistant locations 90 degrees from each other. The detents 48 in the modular head 40 are also at four equidistant locations 90 degrees from each other. The connector 10 also has a male stem 32 projecting along a longitudinal axis $A_m$ that is 90 degrees from the longitudinal axis $A_r$ of the receptacle 16.

Figure 2:
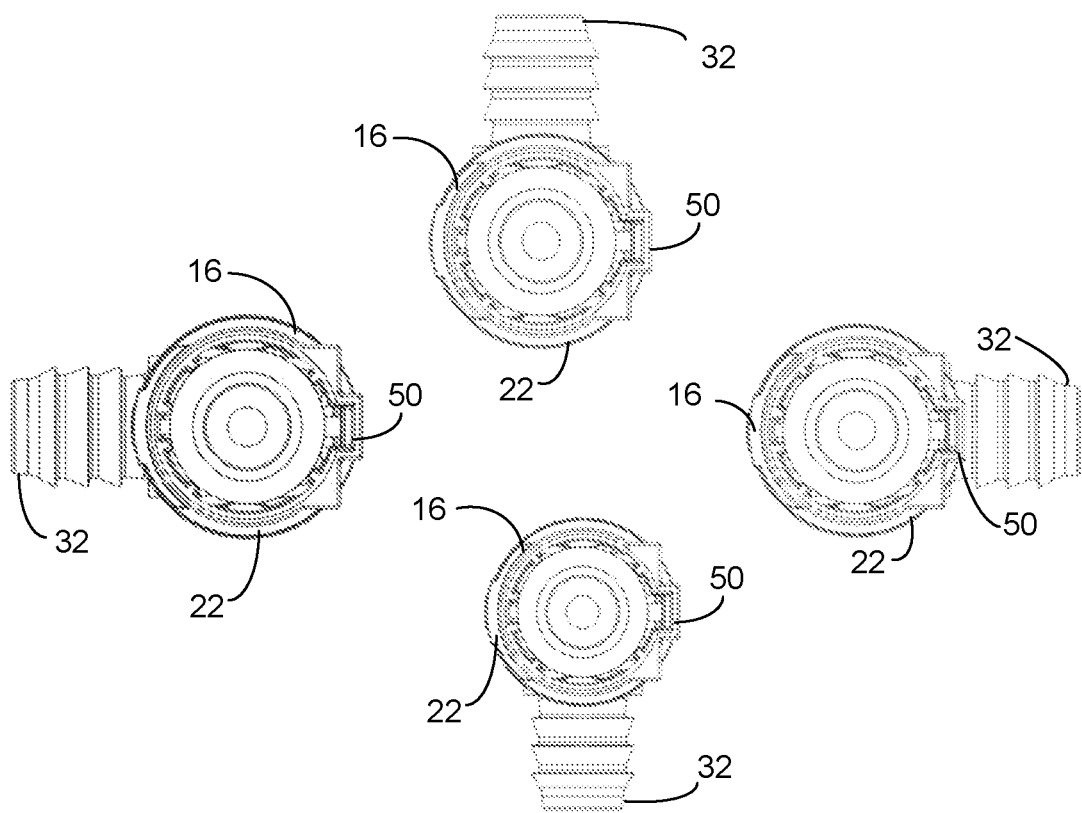
FIG. 2 is a plan view of the connector of FIG. 1 in several orientations.

FIG. 2 illustrates the four orientations with which the modular head 40 is adaptable to be mated to the socket 22 of the receptacle 16. In the top orientation, the male stem 32 and the indexing member 50 are mated 90 degrees from each other, so the indexing member 52 of the endform 14 would only be permitted to be inserted into the receptacle 16 when oriented 90 degrees from the male stem 32. In the right orientation, the male stem 32 and the indexing member 50 are mated 0 degrees from each other, so the indexing member 52 of the endform 14 would only be permitted to be inserted into the receptacle 16 when oriented 0 degrees from the male stem 32. In the bottom orientation, the male stem 32 and the indexing member 50 are mated 270 degrees from each other, so the indexing member 52 of the tube 12 would only be permitted to be inserted into the receptacle 16 when oriented 270 degrees from the male stem 32. In the left orientation, the male stem 32 and the indexing member 50 are mated 180 degrees from each other, so the indexing member 52 of the tube 12 would only be permitted to be inserted into the receptacle 16 when oriented 180 degrees from the male stem 32.

Figure 3:
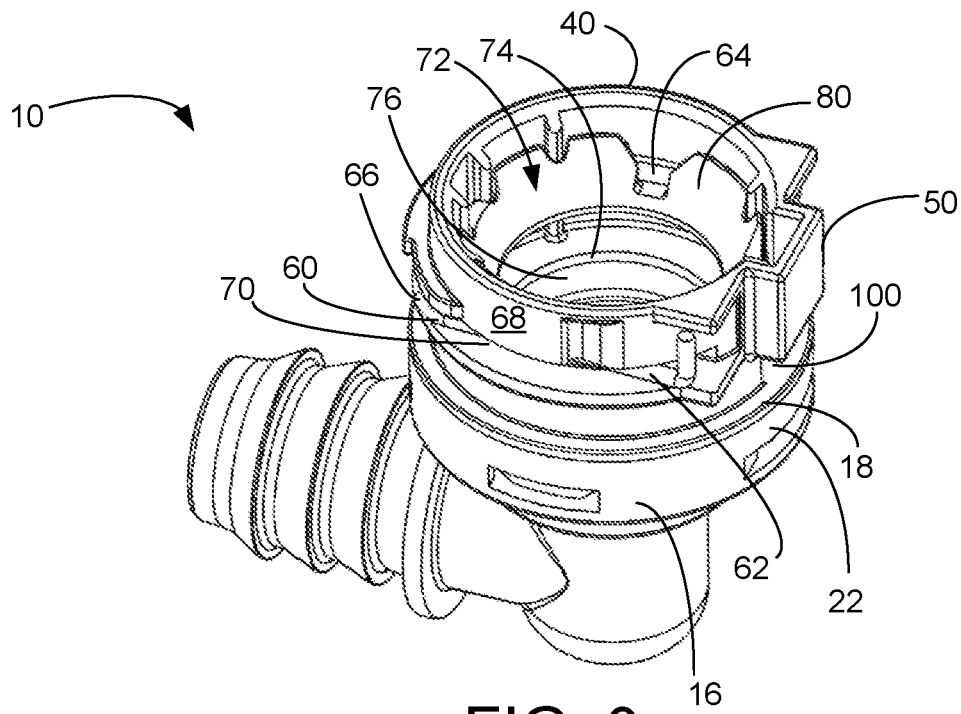
FIG. 3 is an isometric view of the connector of FIG. 1.

The connector 10 with a modular head 40 can be adaptable to configurations with four different orientations between the connector 10 and the endform 14 of the tube 12. Advantageously, only one set of tooling must be fabricated to provide a connector 10 for four different orientations in an end product such as an automobile. It is also contemplated that more or less orientations, such as 2, 8 or 16, be permitted according to the teachings herein. As best shown in FIG. 3, the connector 10 also includes a retention clip 60 embracing the head 40 at the female end 18 of the socket 22. The retention clip has a u-shaped configuration comprising two opposed legs 62, 64 extending from a bight 66. The retention clip 60 is shown in FIG. 3 retained on the modular head 40 mated to the socket 22, but it could be retained directly on the socket. The retention clip 60 may be made of steel. The bight 66 embraces an outer wall 68 of the head 40, but the legs 62, 64 extend through slots 70 in the receptacle 16, and in an aspect, in the modular head 40 permitting the legs to extend into the interior 72 of the modular head 40 when the retention clip is in a relaxed condition. Each leg 62, 64 terminates in an upturned prong which is assembled onto the modular head 40 by passing through a slot contiguous and orthogonal to the slots 70.

The modular head 40 which permits various orientations with respect to the socket 22 can also be rotatable to provide a desired positioning of features of the receptacle 16 in an installed context. For example, the modular head 40 may be oriented with respect to the socket 22 to ensure access to the bight 66 among other equipment when installed.

FIG. 3 also depicts an interior annular groove 74 in the socket 22 of the receptacle 16. The receptacle 16 retains an O-ring 76 installed in the groove 74. When the tube 12 is inserted into the socket 22, the O-ring 76 made of a rubberized material squeezes around the endform 14 of the tube 12 and prevents leakage of fluid passing therethrough.

To couple the tube 12 to the receptacle 16, an orientation is selected for a relationship between the modular head 40 and the receptacle 16. The modular head 40 is rotated with respect to the socket 22 to achieve the selected orientation. The modular head 40 is mated with the socket 22 while mating a detent 48 on a latch 46 on the modular head 40 with an opening 30 on the socket. Alternatively, the detent 48 on a latch 46 on the socket 22 mates with an opening 30 on the modular head. Particularly, the modular head 40 is mated with the socket 22 while mating a plurality of detents 48 on respective latches 46 on the modular head 40 with respective ones of a plurality of openings 30 in the outer wall 26 of the socket. Alternatively, a plurality of detents 48 on respective latches 46 on the socket 22 mate with respective ones of a plurality of openings 30 in the modular head 40.

The second indexing member 52 of the endform 14 shown in FIG. 1 is aligned with the first indexing member 50 of the modular head 40. The second indexing member 52 may be a tab in the endform 14, and the first indexing member 50 may be a groove in the modular head 40. When the indexing members 50 and 52 are aligned, the endform 14 of the tube 12, is inserted into the modular head 40 mated to the receptacle 16. In an aspect, the tab of the second indexing member 52 is received in the groove of the first indexing member 50. The endform 14 of the tube 12 is inserted until legs 62, 64 of the retention clip 60 clips around the groove 13 in the endform 14 to hold the tube in the modular head 40 of the receptacle 12 while the endform 14 is simultaneously inserted into an O-ring 76 retained in the receptacle 16. In an aspect, another tube 36 may be coupled to the coupling end 20 of the receptacle 16.

Figure 4:
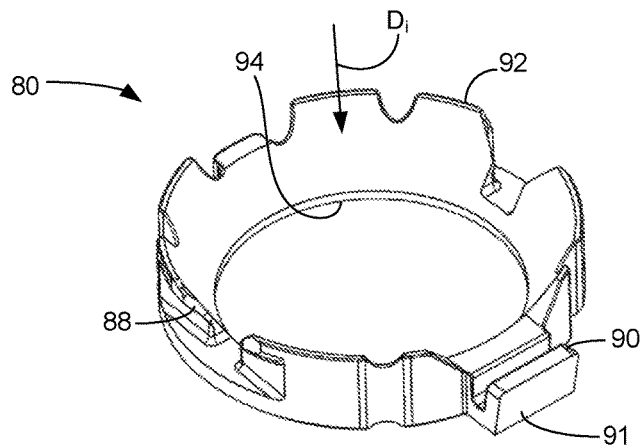
FIG. 4 is an isometric view of a pilot of FIG. 1 disassociated from the connector.

In FIG. 3, a further feature of the connector 10 is disclosed. A pilot 80 is mounted in a mounted position in the receptacle 16. The pilot 80 is an annular crown piece shown in FIG. 4 removed from the connector 10. The pilot 80 includes an indicator piece 90 which may comprise a flat face. The pilot 80 has an inclined wall 88 that has an inner diameter and an outer diameter at a mating end 92 that is greater than an inner diameter and an outer diameter at an engaging end 94. Consequently, an inside and an outside of the wall 88 of the pilot 80 taper inwardly along a direction of insertion $D_i$. The pilot 80 is initially mounted in the modular head 40 which becomes part of the receptacle 16 upon mating the socket 22 and the modular head.

Figure 5:
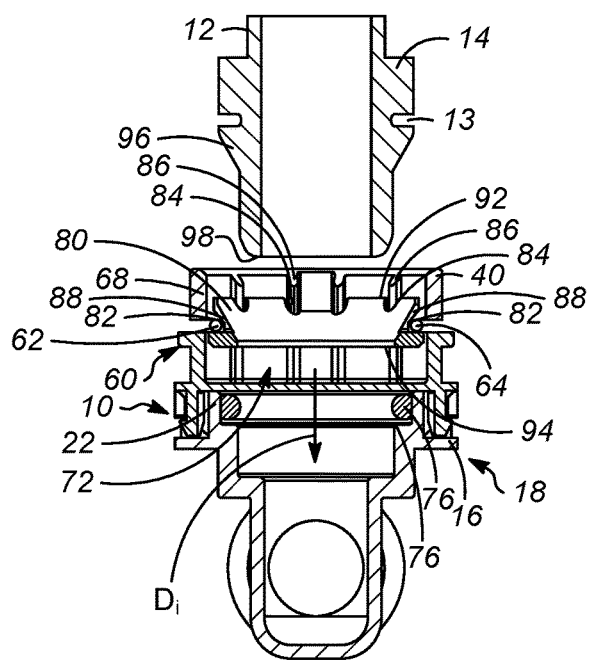
FIG. 5 is a sectional view of the connector of FIG. 1 with the pilot in a mounted position.

The pilot 80 in the receptacle 16 is shown in the mounting position in FIG. 5 which depicts a cross section of the endform 14 approaching insertion into the modular head 40 of the receptacle 16. The pilot 80 has a retention recess 82 that receives the legs 62, 64 of the retention clip 60 while in the mounted position. The pilot 80 has ridge grooves 84 that receive or mate with ridges 86 on the inside of the wall 68 of the modular head 40 of the receptacle 16 to guide vertical sliding movement of the pilot 80. The inclined wall 88 of the pilot 80 is adjacent to the retention recess 82.

Figure 7:
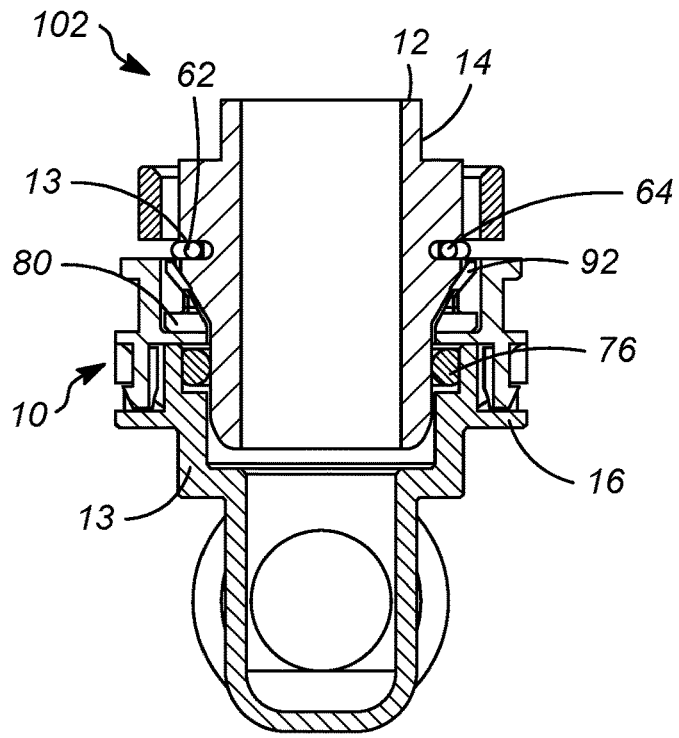
FIG. 7 is a sectional view of the connector of FIG. 1 with the pilot in a final position.

The pilot 80 is slidable from the mounted position shown in FIG. 5 to a final position shown in FIG. 7. Insertion of the endform 14 of the tube 12 into the modular head 40 of the receptacle 16 results in the endform 14 engaging the pilot 80 to initiate transition from the mounted position to the final position.

Figure 6:
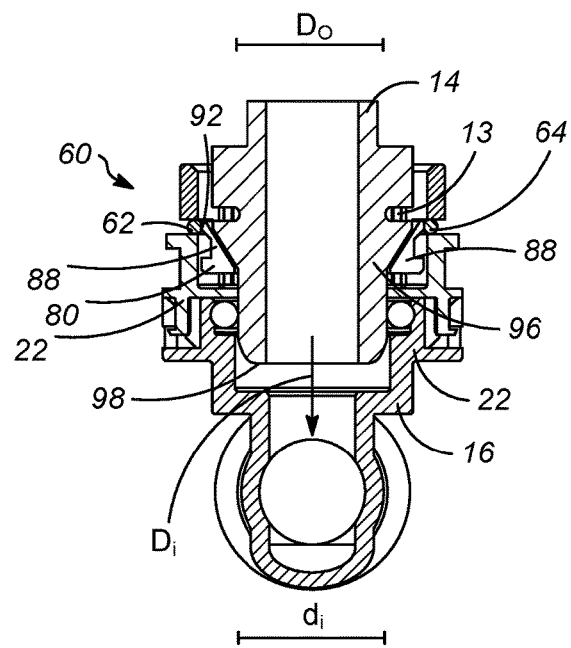
FIG. 6 is a sectional view of the connector of FIG. 1 with the pilot in transition.

The transition of the pilot between the mounted position and the final position is shown in FIG. 6. FIG. 6 is taken at a section further back than FIGS. 5 and 7 to make further illustration. The inner diameter $d_i$ of the pilot 80 at the engaging end 94 may be larger than the outer diameter do of the endform 14 to allow a terminal end 98 of the endform to pass through an inner diameter of the pilot 80 without moving the pilot upon insertion. The terminal end 98 of the endform 14 extends into the socket 22 and is squeezed by the O-ring 76. The endform 14 has an annular ramp 96 adjacent to the groove 13 that tapers inwardly in the direction of insertion $D_i$ to match the inner taper of the inclined wall 88. The inclined wall 88 has an inner taper that receives the annular ramp 96 of the endform 14 after the endform has moved sufficiently past the pilot 80 in the direction of insertion $D_i$. The ramp 96 engages an inner surface of the inclined wall 88 of the pilot 80 during insertion and slides the pilot in the direction of insertion $D_i$ toward the final position. During transition from the mounted position to the final position in the direction of insertion $D_i$, the inclined wall 88 of the pilot 80, buttressed by the ramp 96 engages legs 62, 64 of the retention clip 60. The legs 62, 64 ride along an outer taper of the inclined wall 88 of the pilot 80. The inclined wall 88 urges the legs 62, 64 to spread outwardly during transition. FIG. 6 shows the spread legs 62, 64 just before the end of the transition at the mating end 92 of the pilot 80. The spread legs 62, 64 of the retention clip 60 allow passage of the pilot 80 into the final position of FIG. 7.

Upon entry into the final position, the mating end 92 of the pilot 80 moves past the legs 62, 64 and permits the legs to retract to a relaxed condition in the annular groove 13 of the endform 14, retaining the endform in the receptacle 16. When the pilot 80 is in the final position, the legs 62, 64 of the retention clip 60 do not engage the pilot. FIG. 7 depicts an assembly 102 of the tube 12 and the connector 10.

Figure 8:
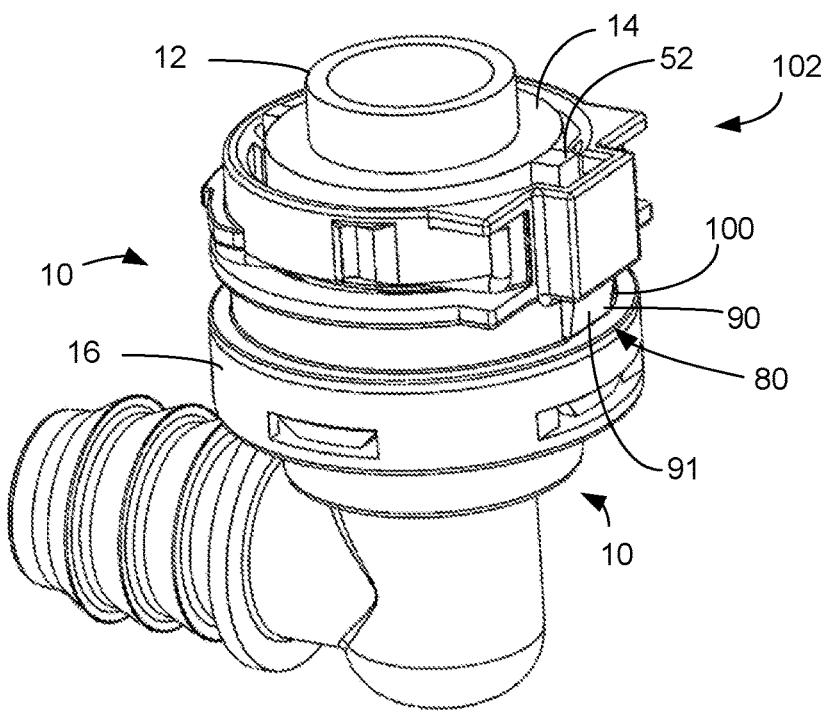
FIG. 8 is an isometric view of the connector of FIG. 1 in a final position.

FIG. 8 illustrates an isometric view of the connector 10 and tube 12 assembly 102 with the pilot 80 in the final position. The indicator piece 90 is located in a window 100 of the receptacle 16 when the pilot 80 is in the final position. When the indicator piece is located in the window 100 in the final position, the indicator piece 90, particularly the face 91 of the indicator piece, is visible from outside of the connector 10. FIG. 3 illustrates the receptacle 16 with the pilot in the mounted position with the face 91 of the indicator piece 90 not in the window 100 and not visible from outside of the connector 10. Referring back to FIG. 8, the indicator piece 90 may be part of the pilot 80, which when engaged by the endform 14 moves the indicator piece 90 into the window 100. In an aspect, the indexing member 52 of the endform 14 may engage the indicator piece 90 when the pilot 80 is sliding from the mounted position to the final position to ensure movement of the indicator piece 90 to the window 100. The indicator piece 90 may include a scan code on its face 91. The scan code may be readable by a scanning device to indicate to a controller that the pilot is in the final position and the tube 12 and connector 10 are securely coupled.

To couple the tube 12 with the connector 10, the endform 14 of the tube is inserted into the interior 72 of the head 40 and into the receptacle 16. Before insertion of the tube 12, the face 91 of the indicator piece 90 is not visible in the window 100 as shown in FIG. 3. The endform 14 of the tube 12 protrudes through the pilot 80 and through the O-ring 76 into the socket 22 of the receptacle 16 until the annular ramp 96 of the endform 14 engages the inclined wall 88 of the pilot 80 as shown in FIG. 6. Further insertion of the endform 14 of the tube 12 slides the pilot 80 mounted in the receptacle 16 from a mounted position to a final position. Transition from the mounted position to the final position causes the outer surface of the inclined wall 88 of the pilot 80 to engage legs 62, 64 of the retention clip 60 and urge the legs into a spread condition as shown in FIG. 6. Consequently, the legs 62, 64 do not engage the endform 14 of the tube 12 between the terminal end 98 and the ramp 96. When the endform 14 of the tube 12 is fully inserted into the final position in the receptacle 16, as shown in FIG. 7, the pilot 80 moves past the legs 62, 64 of the retention clip 60 and into a relaxed condition. The legs 62, 64 of the retention clip 64 embrace the endform 14 when the pilot 80 is in the final position. The legs 62, 64 may snap into the groove 13 of the endform 14 to hold it securely in place in the receptacle 16 of the connector 10. The face 91 of the indicator piece 90 is visible in the window 100 in the receptacle 16 when the pilot 80 is in the final position.

While the following is described in conjunction with specific embodiments, it will be understood that this description is intended to illustrate and not limit the scope of the preceding description and the appended claims.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A connector for coupling a tube comprising:
a receptacle receiving a tube, said receptacle including an annular outer wall having at least one opening and a socket having an inner annular wall concentric with the receptacle outer wall having an equal height and oriented parallel to and in a spaced relationship with the other forming an annulus space between the receptacle outer wall and the socket inner wall;
a modular head having a mating end, said mating end including at least one latch extending from said mating end into the annulus space, said latch engaging said opening and mating said modular head to said socket; and
a retention clip embracing said receptacle, said retention clip having a leg positioned in a slot extending into said receptacle for retaining said tube in said receptacle.

2. The connector of claim 1, wherein the socket and modular head are separate pieces before they are mated together.

3. The connector of claim 2, wherein said modular head can be mated to the socket in a plurality of relative orientations.

4. The connector of claim 1, wherein said modular head includes a plurality of latches with each latch having a detent extending into said annulus space and said receptacle outer wall includes a plurality of openings wherein a respective one of said plurality of detents is configured to fit in a respective one of said plurality of openings upon mating of said modular head to said socket.

5. The connector of claim 4, wherein the plurality of latches are equidistant from each other such that the modular head is adaptable to be mated to the socket in a plurality of orientations.

6. The connector of claim 1, wherein a coupling end extends at an angle from said receptacle.

7. The connector of claim 1, wherein said tube includes a first indexing member and said modular head includes a second indexing member aligned with the first indexing member arranged to guide said tube in said receptacle.

8. The connector of claim 7, wherein said receptacle includes an interior annular groove having an O-ring installed in said groove.

9. A process for coupling a tube to a receptacle comprising:
forming an annulus space between an inner wall of a receptacle socket and a receptacle outer wall, having an equal height that are oriented parallel to and in a spaced relationship with the other, said receptacle outer wall including a plurality of windows;
mating said socket with a modular head, said modular head including a plurality of latches extending from the modular head into said annulus space that engage said plurality of windows;
inserting said tube into said modular head; and
clipping a retainer in a groove in an endform of said tube to hold said tube in said receptacle.

10. The process of claim 9, further comprising selecting an orientation for a relationship between the modular head and the socket and rotating the modular head with respect to the receptacle to achieve said selected orientation before said mating step.

11. The process of claim 10, wherein said modular head includes a first indexing member, the process further including:
aligning a second indexing member formed on said endform with said first indexing member before inserting said tube in said modular head.

12. The process of claim 9, further comprising inserting said endform into an O-ring retained in said receptacle.

13. A connector for coupling a tube comprising:
a receptacle receiving a tube, said receptacle including an annular outer wall having a plurality of openings and a socket having an inner annular wall concentric with the receptacle outer wall having an equal height and oriented parallel to and in a spaced relationship with the other forming an annulus space between the receptacle outer wall and the socket inner wall;
a modular head having a mating end, said mating end including a plurality of latches with each latch including a detent, said latches extending from said mating end into the annulus space, and said modular head including a first indexing member, wherein a respective one of said plurality of detents is configured to fit in a respective one of said plurality of openings upon mating of said modular head to said socket, said latches being equidistant from each other such that the modular head is adaptable to be mated to the socket in a plurality of orientations; and
a retention clip embracing said receptacle, said retention clip having a leg positioned in a slot extending into said receptacle that retains said tube in said receptacle.

14. The connector of claim 13, wherein the socket and the modular head are separate pieces.

15. The connector of claim 13, wherein a coupling end extends at an angle from said receptacle.

16. The connector of claim 13, wherein said tube includes a second indexing member aligned with said first indexing member and arranged to guide said tube when said tube is received by said receptacle.

17. The connector of claim 16, wherein said first tube is inserted into an O-ring in said receptacle.

\* \* \* \* \*